(12) United States Patent
Smith et al.

(10) Patent No.: US 11,430,336 B2
(45) Date of Patent: Aug. 30, 2022

(54) VEHICLE MONITORING SYSTEMS AND METHODS

(71) Applicant: AutoMap, LLC, Kellogg, ID (US)

(72) Inventors: Kenneth Lynn Smith, Cataldo, ID (US); Michael David Smith, Portland, OR (US)

(73) Assignee: Ken Smith, Coeur d'Alene, ID (US)

( * ) Notice: Subject to any disclaimer, the term of this patent is extended or adjusted under 35 U.S.C. 154(b) by 526 days.

(21) Appl. No.: 16/513,550

(22) Filed: Jul. 16, 2019

(65) Prior Publication Data

US 2019/0340931 A1 Nov. 7, 2019

Related U.S. Application Data

(63) Continuation-in-part of application No. 16/167,344, filed on Oct. 22, 2018, now Pat. No. 10,950,133, which is a continuation of application No. 14/796,218, filed on Jul. 10, 2015, now Pat. No. 10,109,201.

(60) Provisional application No. 62/699,635, filed on Jul. 17, 2018, provisional application No. 62/136,329, filed on Mar. 20, 2015.

(51) Int. Cl.
*G08G 1/00* (2006.01)
*G06Q 40/02* (2012.01)
*G06Q 10/08* (2012.01)
*G07C 5/10* (2006.01)

(52) U.S. Cl.
CPC ........... *G08G 1/207* (2013.01); *G06Q 10/087* (2013.01); *G06Q 40/02* (2013.01); *G07C 5/10* (2013.01)

(58) Field of Classification Search
CPC ........ G08G 1/207; G08G 1/20; G06Q 10/087; G06Q 40/02; G07C 5/10; G07C 5/008
See application file for complete search history.

(56) References Cited

U.S. PATENT DOCUMENTS 5,635,693 A 6/1997 Benson et al.
6,806,814 B1 10/2004 Iverson et al.
(Continued)

OTHER PUBLICATIONS

WO PCT/US2019/042075 IPRP, dated Jan. 19, 2021, AutoMap, LLC.
(Continued)

*Primary Examiner* — Donald J Wallace
(74) *Attorney, Agent, or Firm* — Wells St. John P.S.

(57) ABSTRACT

Vehicle monitoring systems and methods are described. According to one aspect, a vehicle monitoring system includes a plurality of vehicle monitoring devices individually configured to communicate with circuitry of a respective one of a plurality of vehicles being monitored by the vehicle monitoring system, to receive vehicle information regarding the one vehicle from the circuitry of the one vehicle at a plurality of moments in time, and to output a plurality of messages externally of the vehicle monitoring device at a plurality of moments in time, wherein the messages from the vehicle monitoring devices include the vehicle information being monitored by the vehicle monitoring system, and a management device configured to receive the messages and the vehicle information included within the messages, to store the vehicle information, to process the vehicle information, and to generate and output a communication regarding the vehicles to a recipient party.

24 Claims, 6 Drawing Sheets

(56) References Cited

U.S. PATENT DOCUMENTS

| | | |
|---|---|---|
| 7,149,206 B2 | 12/2006 | Pruzan et al. |
| 7,774,268 B2 | 8/2010 | Bradley |
| 7,853,375 B2 | 12/2010 | Tuff |
| 8,126,399 B1 | 2/2012 | Lee |
| 8,180,522 B2 | 5/2012 | Tuff |
| 8,565,963 B2 | 10/2013 | Burke, Jr. |
| 8,868,289 B2 | 10/2014 | Miljkovic et al. |
| 8,884,749 B1 | 11/2014 | Palmer |
| 8,897,952 B1 | 11/2014 | Palmer |
| 9,349,223 B1* | 5/2016 | Palmer .................... H04L 67/12 |
| 10,109,201 B2 | 10/2018 | Smith |
| 10,950,133 B2 | 3/2021 | Smith |
| 2002/0070851 A1 | 6/2002 | Raichle et al. |
| 2003/0058280 A1 | 3/2003 | Molinari et al. |
| 2004/0177032 A1 | 9/2004 | Bradley et al. |
| 2006/0161315 A1 | 7/2006 | Lewis et al. |
| 2006/0178793 A1 | 8/2006 | Hecklinger |
| 2006/0277498 A1 | 12/2006 | Mann et al. |
| 2006/0277499 A1 | 12/2006 | Britt et al. |
| 2007/0250228 A1 | 10/2007 | Reddy et al. |
| 2008/0000959 A1 | 1/2008 | Faoro et al. |
| 2008/0082221 A1 | 4/2008 | Nagy |
| 2008/0084334 A1 | 4/2008 | Ballew |
| 2008/0128358 A1 | 5/2008 | Turner et al. |
| 2008/0137860 A1 | 6/2008 | Silvernail |
| 2008/0140281 A1 | 6/2008 | Morris et al. |
| 2008/0147268 A1 | 6/2008 | Fuller |
| 2008/0228346 A1 | 9/2008 | Lucas et al. |
| 2009/0015373 A1 | 1/2009 | Kelly et al. |
| 2009/0150118 A1 | 6/2009 | Naima |
| 2009/0184812 A1 | 7/2009 | Drew et al. |
| 2010/0226585 A1 | 9/2010 | Bradley |
| 2010/0265104 A1 | 10/2010 | Zlojutro |
| 2010/0286912 A1 | 11/2010 | Inoue |
| 2010/0322423 A1 | 12/2010 | Boehler et al. |
| 2011/0063138 A1 | 3/2011 | Berkobin et al. |
| 2011/0080282 A1 | 4/2011 | Kleve et al. |
| 2011/0130905 A1 | 6/2011 | Mayer |
| 2011/0227709 A1 | 9/2011 | Story |
| 2011/0258044 A1 | 10/2011 | Kargupta |
| 2011/0313593 A1 | 12/2011 | Cohen et al. |
| 2012/0106342 A1 | 5/2012 | Sundararajan et al. |
| 2012/0246036 A1 | 9/2012 | Marr et al. |
| 2013/0144770 A1 | 6/2013 | Boling et al. |
| 2013/0181817 A1 | 7/2013 | Shoarinejad et al. |
| 2013/0289819 A1 | 10/2013 | Hassib et al. |
| 2013/0335233 A1 | 12/2013 | Kamar et al. |
| 2014/0025955 A1 | 1/2014 | Bodin et al. |
| 2014/0195100 A1* | 7/2014 | Lundsgaard ......... G07C 5/0841 701/29.6 |
| 2014/0309870 A1 | 10/2014 | Ricci et al. |
| 2015/0029041 A1 | 1/2015 | Liu et al. |
| 2015/0161403 A1 | 6/2015 | Toillon et al. |
| 2016/0275799 A1 | 9/2016 | Smith |
| 2019/0057609 A1 | 2/2019 | Smith |

OTHER PUBLICATIONS

WO PCT/US2016/022213 Inv/Pay Fees, dated May 5, 2016, Automap, LLC.
WO PCT/US2016/022213 IPRP, dated Sep. 26, 2017, Automap, LLC.
WO PCT/US2016/022213 Search Rept, dated Jul. 4, 2016, Automap, LLC.
WO PCT/US2016/022213 Writ Opin, dated Jul. 4, 2016, Automap, LLC.
Smith, "Object Monitoring System and Methods", U.S. Appl. No. 62/136,329, filed Mar. 20, 2015, 15 pages.
Smith et al., "Vehicle Monitoring Systems and Methods", U.S. Appl. No. 62/699,635, filed Jul. 17, 2018, 13 pages.
WO PCT/US2019/042075 Search Rept, dated Oct. 3, 2019, AutoMap, LLC.
WO PCT/US2019/042075 Writ. Opin, dated Oct. 3, 2019, AutoMap, LLC.
EP EP 19837133 Supp. Search Rept., dated Feb. 18, 2022, Smith, Ken.

\* cited by examiner

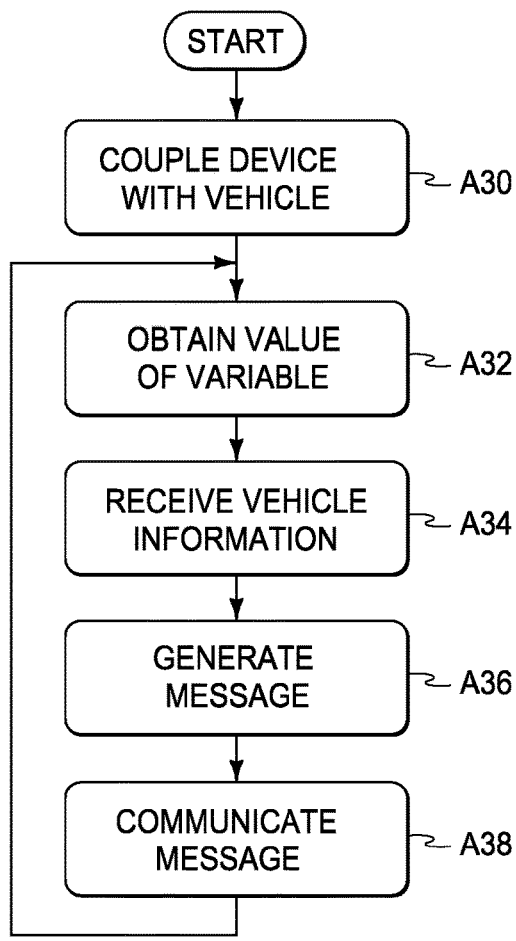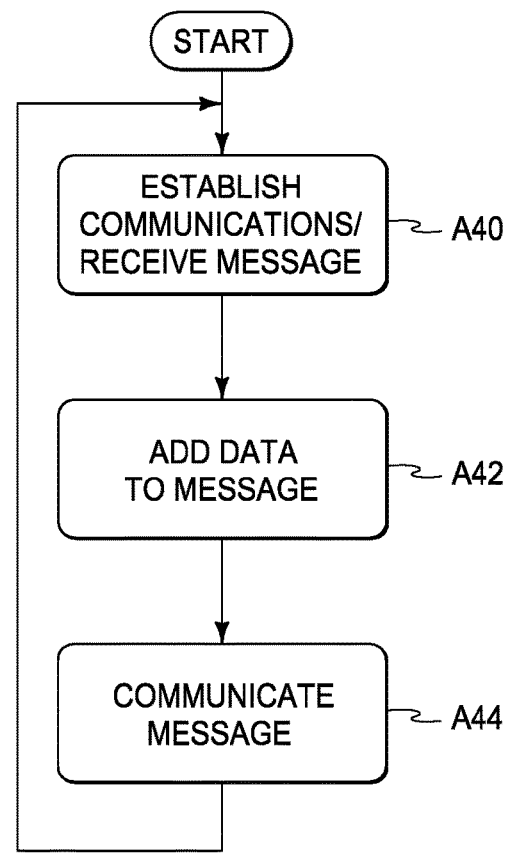
*FIG. 4*　　　　*FIG. 5*

VEHICLE MONITORING SYSTEMS AND METHODS

RELATED PATENT DATA

This application claims the benefit of U.S. Provisional Patent Application Ser. No. 62/699,635, filed Jul. 17, 2018, and is also a continuation-in-part of and claims priority to U.S. patent application Ser. No. 16/167,344, which was filed on Oct. 22, 2018, which is a continuation of and claims priority to U.S. patent application Ser. No. 14/796,218, filed Jul. 10, 2015, now U.S. Pat. No. 10,109,201 and which claims the benefit of U.S. Provisional Patent Application Ser. No. 62/136,329, filed Mar. 20, 2015, the disclosures of which are incorporated herein by reference

TECHNICAL FIELD

This disclosure relates to vehicle monitoring systems and associated methods.

BACKGROUND OF THE DISCLOSURE

When a large number of vehicles, such as automobiles, are stored on a vehicle lot, various things can go wrong with the vehicles. For example, the voltage of the batteries of the vehicles may be drawn down or dead. The owners or people in charge of the vehicles have no way to know about the health of the vehicles until they get into the vehicles and sometimes not even then.

Companies have extra expense when troubles with the vehicles are not known until someone checks on the vehicle, for example, to prepare the vehicle for sale, a test drive, transfer to different location, etc. In but one example, without knowledge that the battery is getting low, the person in charge of the vehicle will not know about the problem until an attempt is made to start the vehicle. For a vehicle dealership, this will likely stop the sale. For a marshalling yard, this can result in delay of the transport of the vehicle. If the vehicle will not start, then extra time and expense is needed to jumpstart the vehicle. Sometimes the battery level has gotten so low that the battery must be replaced. These events may be costly when undetected.

Fuel levels within automobiles may also raise issues for the owners of the vehicles. For example, a low amount of fuel can be a problem for a vehicle dealer in that the vehicle cannot be taken out for a test drive and may result in a lost sale. In the case of factory or marshalling yards, a vehicle which has too much fuel cannot be transported and delays will occur while removing fuel. This can result in the vehicle not getting on the transport (rail, truck, or ship) on time.

Another example is engine error codes. If a vehicle dealer is trying to sell a vehicle and the customer sees the check-engine error light come on, then the sale is likely to fail.

At least some aspects of the disclosure to systems and methods which enable monitoring of statuses of various parameters of vehicles and reporting the statuses to one or more persons when appropriate to assist with management and servicing of the vehicles. Other aspects are described below.

BRIEF DESCRIPTION OF THE DRAWINGS

Example embodiments of the disclosure are described below with reference to the following accompanying drawings.

FIG. 4 is a flow chart of a method performed by a monitoring device according to one embodiment.

FIG. 5 is a flow chart of a method performed by an intermediary device according to one embodiment.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

At least some embodiments of the disclosure include apparatus and methods of monitoring objects. In more specific embodiments, the apparatus and methods provide monitoring and tracking of a plurality of vehicles, such as automobiles upon a lot of a vehicle dealership. Other objects may be monitored and tracked in other implementations.

Example described embodiments provide reliable and trustworthy systems and methods that a bank can believe will correctly report when a vehicle is on a vehicle lot. The device will not necessarily indicate when a device is not on a vehicle lot, but if the monitoring device does report that the vehicle is on the lot, then it can be trusted. The assumption is that while the vehicle is on the lot, then the dealer is justified in continuing the loan and will not need to pay off the vehicle loan. Banks expect loans for vehicles which are no longer on the lots of the vehicle dealerships, or are otherwise no longer within the inventories of the vehicle dealerships to be paid off. Accordingly, banks may utilize the apparatus and methods of the disclosure to determine whether the vehicle dealerships are properly following contractual obligations associated with the financing of vehicles which have been sold in one implementation.

In some embodiments described below, a plurality of vehicle monitoring devices of a vehicle monitoring system communicate with respective vehicles being monitored and communicate information regarding the vehicles to a management device which may implement vehicle monitoring. The management device may provide information regarding the vehicles being monitored to banks as well as other desired parties, such as the vehicle dealerships themselves, in one embodiment.

In addition, some embodiments of the disclosure may be used to provide other information regarding the vehicles being monitored. For example, information regarding the locations of the vehicles on the dealership lots may be provided as well as information indicating if a vehicle monitoring device has been removed from one vehicle and placed in another vehicle.

Figure 1:
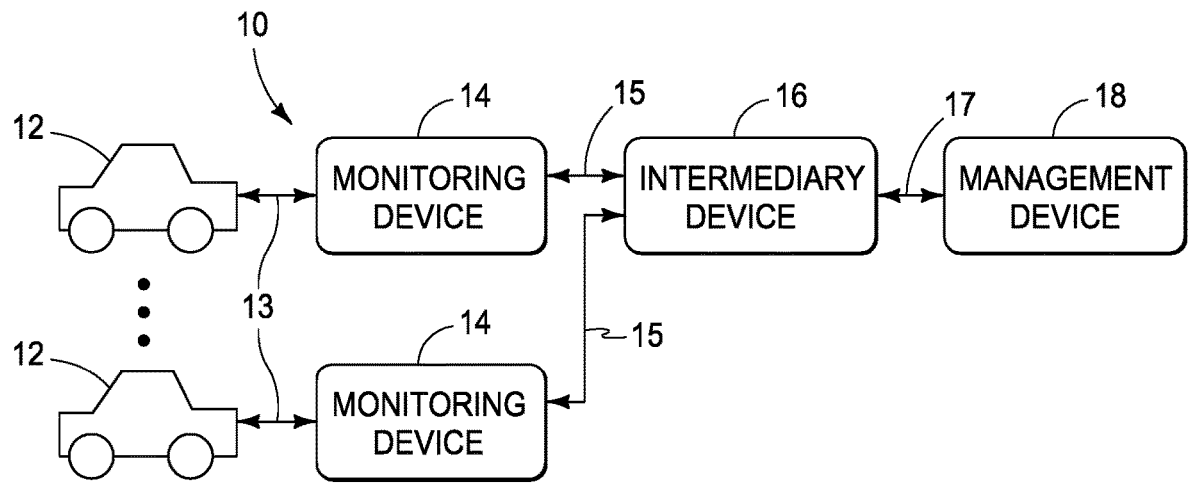
FIG. 1 is an illustrative representation of a vehicle monitoring system according to one embodiment.

Referring to FIG. 1, one example embodiment of a vehicle monitoring system 10 is shown. The example illustrated system includes a plurality of vehicle monitoring devices 14, one or more intermediary device 16 and a management device 18. Other embodiments including more, less and/or alternative devices are possible. For example, intermediary device 16 may be omitted in some embodiments and the monitoring devices 14 may communicate directly with management device 18.

The monitoring devices 14 are configured to monitor a plurality of vehicles 12, for example, within inventory of a vehicle dealership. The monitoring devices 14 may also be referred to as diagnostic devices. In the illustrated embodiment, the monitoring devices 14 are configured to establish respective communications 13 with respective vehicles 12. In a more specific embodiment, the monitoring device 14 communicates with an on-board computer or other circuitry of the vehicle being monitored (e.g., the device 14 may be coupled with an OBD socket of vehicle 12). In some arrangements, the monitoring device 14 may receive operational energy from the vehicle 12 as well.

The monitoring devices 14 are configured to receive information regarding the vehicles 12 being monitored at a plurality of moments in time (e.g., continuously) via communications 13 and are configured to generate a plurality of messages including the information regarding the vehicles 12 being monitored and perhaps other data as described further below. Furthermore, the monitoring devices 14 may output the generated messages externally of the monitoring devices 14 via respective communications 15. As discussed below, the generated messages may also include timing data which may be used to validate the associated data included within the messages in example embodiments of the disclosure.

The intermediary device 16 communicates with and receives the messages from the monitoring devices 14 via the communications 15. Some embodiments may include a plurality of intermediary devices 16 which communicate with the monitoring devices 14, although only one intermediary device 16 is shown in FIG. 1.

In example embodiments, the intermediary device 16 is a computing device such as a smart phone running an application, a notebook computer, a tablet computer, etc. The intermediary device 16 is configured to receive the messages and data from the monitoring devices 14, including information regarding the vehicles 12 being monitored, and to output the received data and perhaps other data as described further below in a plurality of messages via communications 17. As discussed further below, additional timing data may be added to the messages in one embodiment. For example, the additional timing data may include timestamps of the dates and times the respective messages were received by the intermediary device 16.

The management device 18 communicates with and receives the messages from the intermediary devices 16 via the communications 17 in the illustrated embodiment. The management device 18 may receive the messages directly from the monitoring devices 14 in other embodiments.

The management device 18 is implemented as a server in one possible implementation. The management device 18 is configured to receive the messages and data from the intermediary devices 18 including information regarding the vehicles 12 being monitored and additional information. The management device 18 processes the received data of the messages and generates reports and alerts with respect to the vehicles or other objects being monitored. In some embodiments, management device 18 is also configured to generate timing data for the messages corresponding to moments in time when the respective messages are received by the management device 18. Furthermore, management device 18 may be configured to monitor and manage vehicles on a plurality of different lots of different vehicle dealerships in one embodiment.

The communications 13, 15, 17 may be implemented using an appropriate form for communicating data including wireless and/or wired communications. In more specific examples, communications 13, 15, 17 may each be implemented using one or more of Bluetooth, WiFi, cellular, wired connections and/or other wireless communications.

Figure 2:
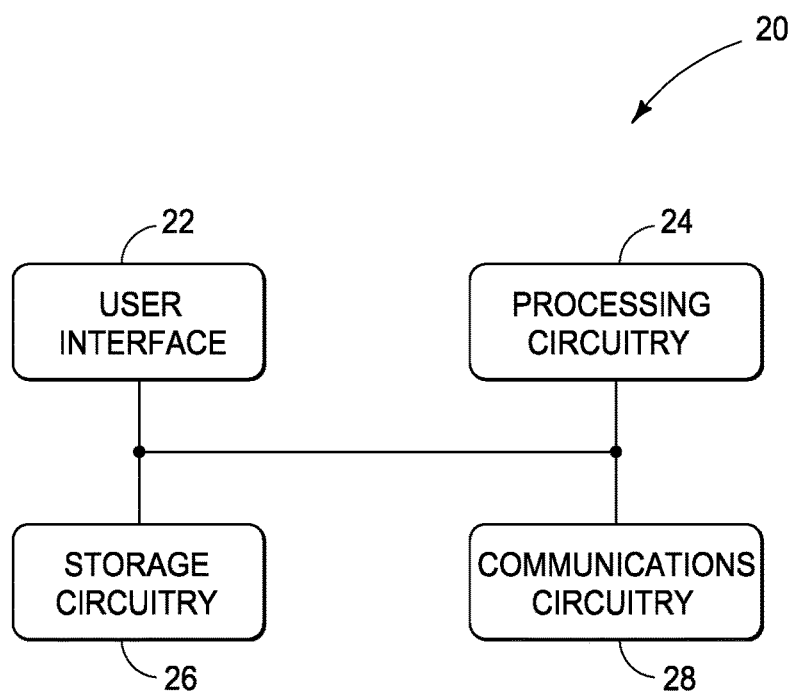
FIG. 2 is a block diagram of a computing device according to one embodiment.

Referring to FIG. 2, an example computing device 20 is shown according to one embodiment. One or more of the monitoring device 14, intermediary device 16 and management device 18 have the configuration of the illustrated computed device 20 in example embodiments. In the example embodiment, computing device 20 includes a user interface 22, processing circuitry 24, storage circuitry 26, and communications circuitry 28. Other embodiments of computing device 20 are possible including more, less and/or alternative components or circuitry.

User interface 22 is configured to interact with a user including conveying data to a user (e.g., displaying visual images for observation by the user) as well as receiving inputs from the user, for example using one or more input device, keyboard, touchscreen, etc.

In one embodiment, processing circuitry 24 is arranged to process data, control data access and storage, issue commands, and control other desired operations. Processing circuitry 24 may comprise circuitry configured to implement desired programming provided by appropriate computer-readable storage media in at least one embodiment. For example, the processing circuitry 24 may be implemented as one or more processor(s) and/or other structure configured to execute executable instructions including, for example, software and/or firmware instructions. Other example embodiments of processing circuitry 24 include hardware logic, PGA, FPGA, ASIC, state machines, and/or other structures alone or in combination with one or more processor(s). These examples of processing circuitry 24 are for illustration and other configurations are possible.

Storage circuitry 26 is configured to store programming such as executable code or instructions (e.g., software and/or firmware), electronic data, databases, or other digital information and may include computer-readable storage media. At least some embodiments or aspects described herein may be implemented using programming stored within one or more computer-readable storage medium of storage circuitry 26 and configured to control appropriate processing circuitry 24. In one embodiment, information regarding vehicles being monitored may be stored using storage circuitry 26.

The computer-readable storage medium may be embodied in one or more articles of manufacture which can contain, store, or maintain programming, data and/or digital information for use by or in connection with an instruction execution system including processing circuitry 24 in one embodiment. For example, computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications circuitry 28 is arranged to implement communications of computing system 10 with respect to external devices (not shown). For example, communications circuitry 28 may be arranged to communicate information bi-directionally with respect to computing system 10 and include hardware for wired connections (e.g., network interface card (NIC), serial or parallel connections, USB port, Firewire interface), and/or circuitry for wireless connections (e.g., Bluetooth, Cellular, GPS, WiFi, etc.).

In one embodiment, the vehicle monitoring system 10 uses an independent timing protocol or reference to synchronize the monitoring devices 14 and management device 18 in time and which may be utilized to assure that the generated information regarding the vehicles being monitored is valid and can be trusted. The independent timing protocol is independent in the sense that it is not based upon a calendar based timing system (e.g., date and time of day) in one arrangement. In one embodiment, timing data or information of the independent timing protocol is internally generated within the vehicle monitoring system 10 without the use of any communications which originate external of the vehicle monitoring system 10, for example GPS signals. The use of timing data which is independent of a calendar based timing system provides a system 10 of increased security since the timing data is not readily apparent to those not aware of the independent timing protocol or reference being utilized.

In one embodiment, a monitoring device 14 is configured to generate timing data of the independent timing protocol which is indicative of timing of the information regarding the vehicle (e.g., the timing data may be indicative of moments in time when the respective vehicle information is received from the vehicle). The timing data is used to synchronize the management device 18 with the monitoring device 14 and can be used to determine whether the vehicle information contained within the messages communicated from the monitoring device 14 is valid or has expired in one implementation.

In one embodiment, the timing data generated by the monitoring device 14 is a plurality of values of a timing variable at different moments in time. In a more specific example, monitoring device 14 generates a first value of the timing variable that is thereafter incremented periodically to generate subsequent timing data (e.g., incremented values of the timing variable which are indicative of passages of time for the information regarding the vehicle contained within the respective messages from the first value of the timing variable) in accordance with parameters of the independent timing protocol. For example, the parameters may define to increment the first (or updated) value of the timing variable by a known amount (e.g., one) according to a period (e.g., hourly). The values of the timing variable at the different moments in time are the timing data within the messages which may be used as a rolling timestamp reference of the independent timing protocol in one implementation.

In one embodiment, the timing variable is an integer and the first value of the integer is randomly generated by the monitoring device 14 when the monitoring device 14 is powered-up (e.g., coupled with the OBD port of the vehicle). The monitoring device 14 may randomly generate a new first value of the timing variable each time the device 14 is powered-up from a powered-down state in one implementation. In other embodiments, the first value of the timing variable may be generated by another device (e.g., management device 18) and communicated to the monitoring devices 14.

The management device 18 is aware of the independent timing protocol (e.g., the frequency of updates to the value of the timing variable and the amount of each update) in one embodiment. The management device 18 may not receive all messages which are outputted by the monitoring device 14. However, once a message is received from the monitoring device 14, the management device 18 performs a registration process described below with respect to the monitoring device 14 and associated vehicle. The value of the timing variable contained within the first message which is received by the management device 18 from the monitoring device 14 may be used as an initial value of the timing variable which corresponds to or indicates an initial reference moment in time of the independent timing protocol. This initial reference moment in time may be used to generate subsequent timing data (e.g., updated values of the timing variable) which may be compared with timing data within subsequent messages which are received from the monitoring device 14.

Accordingly, the monitoring device 14 and management device 18 may be considered to be synchronized with the independent timing protocol after management device 18 has received the initial value of the timing variable and which may be used as a registration value as described further below. In some embodiments, the parameters of the independent timing protocol may be changed at different moments in time for additional security of the timing data contained within the messages. In addition, different parameters of the independent timing protocol may be used for communications of the management device 18 with different monitoring devices 14 in one embodiment.

In one embodiment, the processing circuitry of the monitoring device 14 randomly generates the first value of the timing variable upon power-up and thereafter increments the value of the timing variable. As discussed above, different values of the timing variable are timing data which are included within different messages generated by the monitoring device 14 and are associated with different information regarding the vehicle which is received from the vehicle at a plurality of moments in time. Accordingly, in one embodiment, the timing data of a given message corresponds to and indicates the respective timing of the receipt of the information regarding the vehicle by the monitoring device 14 which is contained with the message, and which indicates the amount of time which has passed since the initial reference moment in time. In one more specific example, the values of the timing variable included in the messages correspond to the moments in time when the information regarding the vehicle contained within the respective messages was received by the monitoring device 14. The messages including the timing data may be referred to as timestamped messages in one embodiment.

For example, the value of the timing variable when information regarding the vehicle is received may be associated with the respective information regarding the vehicle in an individual message. Thereafter, the value of the timing variable is incremented and the incremented value indicates the passage of time from the initial reference moment in time to the moment in time when subsequent information regarding the vehicle is received by the monitoring device 14. The incremented value of the timing variable may be associated with the subsequently received information regarding the vehicle in one of the subsequent messages in one embodiment.

As mentioned above, the monitoring device 14 is configured to determine the first value of the timing variable after the monitoring device 14 is coupled with and establishes communications with the vehicle 12 via the OBD port in one example embodiment. For example, upon coupling with the OBD port of the vehicle 12, the monitoring device 14 receives power from the vehicle 12 and communicates with the vehicle 12, and as a result randomly generates the first value of the timing variable.

As mentioned previously, one of the monitoring devices 14 implements communications 13 with respect to a vehicle being monitored, for example, via an OBD port or socket of the vehicle. In one embodiment, processing circuitry of the monitoring device 14 executes software that queries the vehicle for vehicle information such as the vehicle's unique vehicle identification number (VIN) and then also receives and encrypts the following data into an encrypted data packet or message (e.g., a 31-32 byte encrypted code): (1) the queried VIN; (2) the integer/incremented integer; (3) the monitoring device's factory-assigned unique media access control (MAC) code; and (4) any other information regarding the vehicle, such as mileage, fuel level, etc.

Encryption of the data in the messages adds additional protection to the data therein and increases the difficulty of re-engineering the operations of the system. The encrypted data may include the information regarding the vehicle contained within the message as well as the timing data (e.g., value of the timing variable) which indicates the timing of when the information regarding the vehicle was received by the monitoring device 14.

In one embodiment, the monitoring device 14 is configured to periodically and continuously, such as once a second, output the timestamped, encrypted messages via communications 15. The encryption of the data within the messages, for example, including the timing data and the VIN of the vehicle, makes it more difficult for other parties to obtain and replicate the data, including the timing data. Without the timing data, it is more difficult for other parties to generate messages which will not be detected as being invalid as described further below.

In one operational method, intermediary device 16 is moved throughout different geographical locations of a lot of the vehicle dealership. The intermediary device 16 is placed in a "scan" mode in one implementation to be able to receive the broadcast messages from the monitoring devices 14 of vehicles of the dealership as the intermediary device 16 is moved throughout the lot.

In one embodiment, the intermediary device 16 receives the messages which were broadcast from the monitoring devices 14, and executes its own software program that may add various data to the messages. For example, in one embodiment, timestamp data indicative of times and dates when the messages were received by the intermediary device 16 and location data (e.g., GPS, latitude, longitude) of the intermediary device 16 when the messages were received by the device 16 are added to the messages.

In some embodiments, management device 18 may add timestamp data to the messages which is indicative of the times and dates when the messages are received by the management device 18 and the intermediary device 16 may or may not add its respective timestamp data to the messages.

In one embodiment, the intermediary device 16 comes into the transmission range of the monitoring device 14 and either automatically receives the broadcast messages from the monitoring device 14, or does a scan for devices emitting messages and discovers the broadcast messages. Following the addition of any data to the received messages, the intermediary device 16 outputs the timestamped, encrypted data messages (with any additional data) via communications 17 to management device 18. In one embodiment, the intermediary device 16 does not decrypt the data contained in the received messages, but rather adds additional data to the messages and outputs the messages externally of the intermediary device 16 via communications 17. In one embodiment, the intermediary device 16 is unaware of and cannot access encrypted data of the messages, such as the first timing data (e.g., values of the timing variable).

The management device 18 receives the transmitted messages from the intermediary device 16 via communications 17 and executes a software program that decrypts the messages, and extracts and processes the data therein including the VIN, the MAC, the information regarding the vehicle being monitored, and the value of the timing variable in one embodiment. For example, the data may be processed including comparing data within the messages with records of the vehicles being monitored in a database as discussed further below. The management device 18 may generate reports and alerts regarding the vehicles being monitored as a result of the processing of the data in the messages and the records in the database. Management device 18 may also add timestamp data to the messages which indicates the times and dates of receipt of the respective messages.

Additional details regarding processing of data within the messages by the management device 18 are described below according to one illustrative embodiment. The management device 18 stores or has access to a stored database with vehicle data records of the vehicles being monitored in one embodiment. The management device software searches the database to see if a record exists for the VIN pulled from a received message in one embodiment. For example, the database may include a plurality of records for a plurality of vehicles being monitored. In one more specific embodiment, the records may correspond to vehicles in an automobile dealer's inventory which were purchased from a manufacturer using loaned funds from a bank or other financial institution. As mentioned previously, the disclosed systems and methods of monitoring vehicles may be used by the bank to verify that the automobiles which have not been sold (and the corresponding loans not paid off) are still on the dealer's lot in one example application.

If no record exists for the vehicle, the management device software program creates a "registration" or reference record for the VIN that includes all the data in the message. Notably, the record includes the initial value of the timing variable which was included in the first message which was received by the management device from the monitoring device as a base timestamp of the independent timing protocol, and to which timing data of subsequently-received messages is compared and which may be used to provide time synchronization of the management device 18 with the respective monitoring device 14 which generated the message. The initial value of the timing variable may also be referred to as the registration value of the timing variable and corresponds to an initial reference moment in time of the independent timing protocol. This completes the "registration" process for the monitoring device 14 and corresponding vehicle being monitored in the system. Accordingly, in one embodiment, the records of the vehicles being monitored are added to the database over time as messages are received by the management device 18.

The initial value of the timing variable may not be the first value of the timing variable generated by the monitoring device 14. For example, one or more messages including different values of the timing variable may not be received by the management device 18, and accordingly, the initial value of the timing variable may be an updated value of the timing variable which has been updated from the first value.

If a vehicle data record already exists in the database for the VIN of a vehicle within a received message, the management device software program performs a comparison of the data based on the VIN and stores any new data from the message into the vehicle data record of the respective vehicle in one embodiment.

In addition, the management device 18 processes the data of the received message to determine whether the information regarding the vehicle being monitored and contained within the message is valid (as well as the other data included in the message) in the described embodiment. More specifically, in one embodiment, the processing circuitry of the management device 18 uses different timing data of the messages themselves to determine whether the data contained with the messages is valid.

In one embodiment, the processing circuitry of the management device 18 compares different timing data of the messages (e.g., timing data of the independent timing protocol and timing data of a calendar based timing system) to determine whether the messages and data are valid. In a more specific embodiment, the processing circuitry uses the first timing data (e.g., initial value of the timing variable and the updated value of the timing variable contained with the current message being processed) as well as the parameters of the independent timing protocol to calculate a first amount of time between the message transmitted by the monitoring device 14 (and received by the management device 18) containing the initial (registration) value of the timing variable and the current message being processed. The processing circuitry also uses the time and date timing data of the calendar based timing system which is associated with the message which contained the initial value of the timing variable and the current message being processed to calculate a second amount of time between the respective messages. In particular, the processing circuitry calculates the second amount of time using the time and date timestamp of the message which contained the initial value of the timing variable and the time and date timestamp of the current message.

Accordingly, the first amount of time and second amount of time correspond to different calculations (using different timing protocols) of the passage of time from the initial reference moment in time to the moment in time associated with the current message being processed. As mentioned above, the different timing protocols are independent from each other in one embodiment, for example, one protocol based upon a calendar while the other protocol is independent of the calendar. In addition, timing data which is processed is generated by a plurality of different devices (e.g., monitoring device 14 as well as intermediary device 16 and/or management device 18) in one more specific embodiment.

In one embodiment, the first timing data contained with the messages generated by the monitoring device 14 is indicative of timing of the information regarding the vehicle (e.g., when the information regarding the vehicle was received by the monitoring device 14) and the second timing data is indicative of timing of the messages themselves, for example when the messages are received by the intermediary device 16 or management device 18.

The management device 18 compares the calculated first and second amounts of time to determine whether the message and data therein are valid. In one embodiment, the software allows for a specified grace period of time and the compared amounts of time are not expected to match exactly. In particular, if the differences in time calculated using the different timing data are within the specified grace period of time (e.g., 2 hours or less difference), then the message and data are determined to be valid. The message and data therein are determined to be invalid if the first and second amounts of time differ by an amount greater than the grace period. The comparison of the different amounts of time determined according to the different timing protocols makes the corresponding data of the message expire in one embodiment. This prevents someone from just recording the monitoring device broadcast and replaying it in an attempt to spoof the system. If the result of the time comparison is outside the expected time frame (e.g. two hours), then it is considered that someone is trying to spoof the system 10 and the management device 18 will generate an alert to report that something suspicious may be occurring for additional investigation of the respective vehicle being monitored.

In one embodiment, if the time periods of the different timing protocols match up, the message is valid and the data of the message is stored in the database and the VIN is verified which indicates that the vehicle is on the dealer's lot. If the time periods do not match up, the software generates an alert of some kind in one embodiment. The alert is used to indicate that there may be an issue with the vehicle which corresponds to the VIN for further investigation in one embodiment. In example embodiments, a display of the management device 18 may communicate the alert and an email or text alert may also be sent from the management device 18 to appropriate personnel. Any appropriate form for an alert may be used.

In one embodiment, if the monitoring device 14 is unplugged from the vehicle 12 for any reason or if the vehicle's battery is drained and no power is provided to the monitoring device 14 from the vehicle 12, the monitoring device 14 is automatically cleared and needs to be re-registered when it's plugged back into either a new vehicle 12 or when the vehicle's battery is charged and again supplying power to the monitoring device 14. All data is cleared in the monitoring device 14 including the obtained VIN, the value of the timing variable, the MAC, etc. when power is lost in one embodiment. When a new power source is supplied, the monitoring device 14 automatically re-generates a new random value of the timing variable, requeries the on-board computer for the vehicle's VIN, re-obtains its own MAC address, and begins generation and communication of messages in one arrangement.

When the monitoring device 14 loses power from the vehicle 12 for any reason, it stops broadcasting messages in one embodiment. The failure of the management device 18 to receive a message within a specified amount of time for a given record/vehicle is used in one embodiment to generate an alert for further investigation of the vehicle which corresponds to the record. For example, if the broadcast messages from a monitoring device 14 stop, but the system expects them to continue, such as the intermediary device 16 coming within range of where the vehicle 12 with the monitoring device 14 is expected to be, the software on the management device 18 generates an alert indicating the lack of receipt of a broadcast message from the particular monitoring device 14 so any necessary follow-up can be performed to locate the corresponding vehicle.

In one embodiment, messages from a given monitoring device 14 and based upon the same initial value of the timing variable must be continuously received within a given amount of time from previously-received messages from the same monitoring device 14, or otherwise an alert may be generated by the management device 18 and sent to appropriate personnel regarding the corresponding vehicle 12 of the monitoring device 14 for further investigation to determine whether the vehicle 12 is on the dealer's lot or not. The amount of time in which the messages are to be received to avoid the generation of an alert may be varied for different implementations. For example, for more risky dealers, the amount of time may be less, such as every two days, while the amount of time may be longer, such as every six weeks, for other dealers.

The vehicle monitoring system 10 may also provide additional information regarding the vehicles being monitored. For example, information regarding the locations of the vehicles on the dealership lots may be provided to the dealers on a continuous basis.

Figure 3:
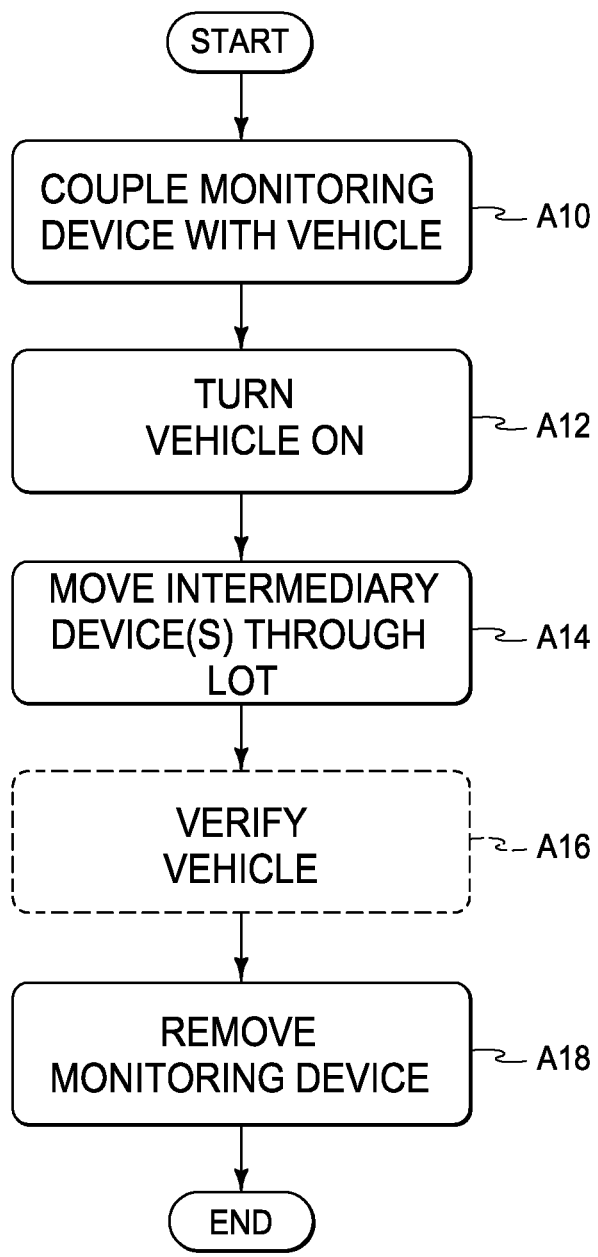
FIG. 3 is a flow chart of an implementation of use of the vehicle monitoring system according to one embodiment.

Referring to FIG. 3, use of systems and methods of the disclosure for vehicle financing by banks is described in one example implementation. As a condition of a bank loan for a vehicle, the dealer agrees to the following conditions in one example:

At an act A10, the vehicle dealer plugs the monitoring device into the vehicle soon (or immediately) after the loan is started. This will often be soon after the vehicle is dropped at the dealer lot by the factory.

At an act A12, the vehicle is turned on sometime soon after installation of the monitoring device. The exact timing of turning on the vehicle is not important. The vehicle needs to be turned on at least once before the monitoring device can be detected in one embodiment. The monitoring device queries the vehicle for information as discussed previously and also generates the first value of the timing variable. Thereafter, following detection, the vehicle may be turned off and the monitoring device continues to receive operational energy from the vehicle after the vehicle is turned off in one embodiment.

At an act A14, one or more employees of the vehicle dealership will run an application on their intermediary devices while they are walking the vehicle lots as already part of their jobs. The application runs in the background on their intermediary devices and does not require any input from the intermediary device operators in one embodiment. Except for manual vehicle verification discussed below in act A16, this example vehicle monitoring application does not require any more additional walking by the employees then is already being done throughout the work day. While vehicle monitoring may be accomplished using one intermediary device, all employees who routinely walk the lots or move vehicles, may have associated intermediary devices to provide improved results, such as more frequent updates with respect to the vehicles being monitored.

At an act A16, although seldom needed, upon request of the bank, the dealer will have someone who is using the application on their intermediary device walk out to where the vehicle being monitored is in order to update the location of the vehicle and generate at least one valid message to prove to the bank that the vehicle is still on the lot. This should rarely be needed if many employees are running the application on their intermediary devices since their devices will routinely report information regarding the vehicles as described above.

At an act A18, when the vehicle is sold, then the monitoring device will be removed from the vehicle and kept by the dealer for use on a different vehicle later.

In addition to the benefits provided to the bank in this example, the dealer benefits in having instant access to the last known location of the vehicle on his lot in one embodiment. This instant access of vehicle location may be provided to a dealer for a fee in one arrangement.

Some of the benefits of the systems and methods of the disclosure to the bank include less expensive audits as a person may not be needed to do the audit or the person will not be spending as much time doing the audit. Nearly instant audits may be performed at an increased frequency (currently audits are done every 2 to 6 months in some arrangements). In addition, issues or problems regarding financed vehicles may be caught earlier. By doing audits more frequently, problems are caught sooner as well as cause the dealer to be more prompt and honest in dealing with the bank. In addition, loans to smaller dealers may become more practical which may open new markets for the bank (currently small dealers in out-of-the-way locations can be prohibitively expensive to audit). Vehicle mileage information may be provided since the last time that the OBD was cleared which will help indicate to the bank whether excessive mileage has been added to the vehicle since the start of the loan. Information regarding fuel and battery levels of the vehicles may be provided to the dealer for use and information regarding the last time that the vehicle was started may be provided to the bank which helps establish the existence of the engine in the vehicle. In addition, information may be provided indicating if a vehicle monitoring device has been removed from one vehicle and placed in another vehicle (e.g., by recognizing the failure of the management device to receive a message from the initial vehicle as well as recognizing the receipt of the new messages from the same monitoring device which is coupled with the subsequent different vehicle).

Referring to FIG. 4, a flow chart of operations performed by a monitoring device are described according to one embodiment. Other embodiments are possible including more, less and/or alternative acts. The described acts are controlled using processing circuitry of the monitoring device in one embodiment.

Initially, at an act A30, communications are established between a vehicle to be monitored and a monitoring device. For example, the monitoring device may be coupled with the OBD port of the vehicle in one arrangement.

At an act A32, the monitoring device obtains a first value of a timing variable of the independent timing protocol for time synchronization with other devices. The first value of the timing variable may be randomly generated and used for the initial message regarding the vehicle in one embodiment. Thereafter, the monitoring device periodically increments the value of the timing variable a known amount in accordance with the independent timing protocol, and additional messages after the initial message include the respective updated values of the timing variable which also correspond to the moments in time when the additional messages are generated in one embodiment.

At an act A34, the monitoring device receives information regarding the vehicle being monitored as discussed above.

At an act A36, the monitoring device generates a message including the first (or updated) value of the timing variable and the information regarding the vehicle. The data within the message is encrypted in one embodiment.

At an act A38, the monitoring device communicates the generated message externally of the monitoring device.

The process of FIG. 4 returns to act A32 and continuously generates and outputs additional messages with new data corresponding to the moments in time when the additional messages are generated and/or vehicle information is received from the vehicle being monitored.

Referring to FIG. 5, a flow chart of operations performed by an intermediary device are described according to one embodiment. Other embodiments are possible including more, less and/or alternative acts. The described acts are controlled using processing circuitry of the intermediary device in one embodiment.

An intermediary device in the vicinity of the monitoring device receives an outputted message from the monitoring device at an act A40.

At an act A42, the intermediary device adds additional data to the message including a timestamp (e.g., date/time information and location data of the intermediary device from GPS when the message is received).

At an act A44, the intermediary device communicates the message with the additional data externally of the intermediary device.

The method of FIG. 5 returns to act A40 and the intermediary device continues to monitor for the reception of additional messages from the monitoring device at act A40 which are processed as discussed above.

Figure 6:
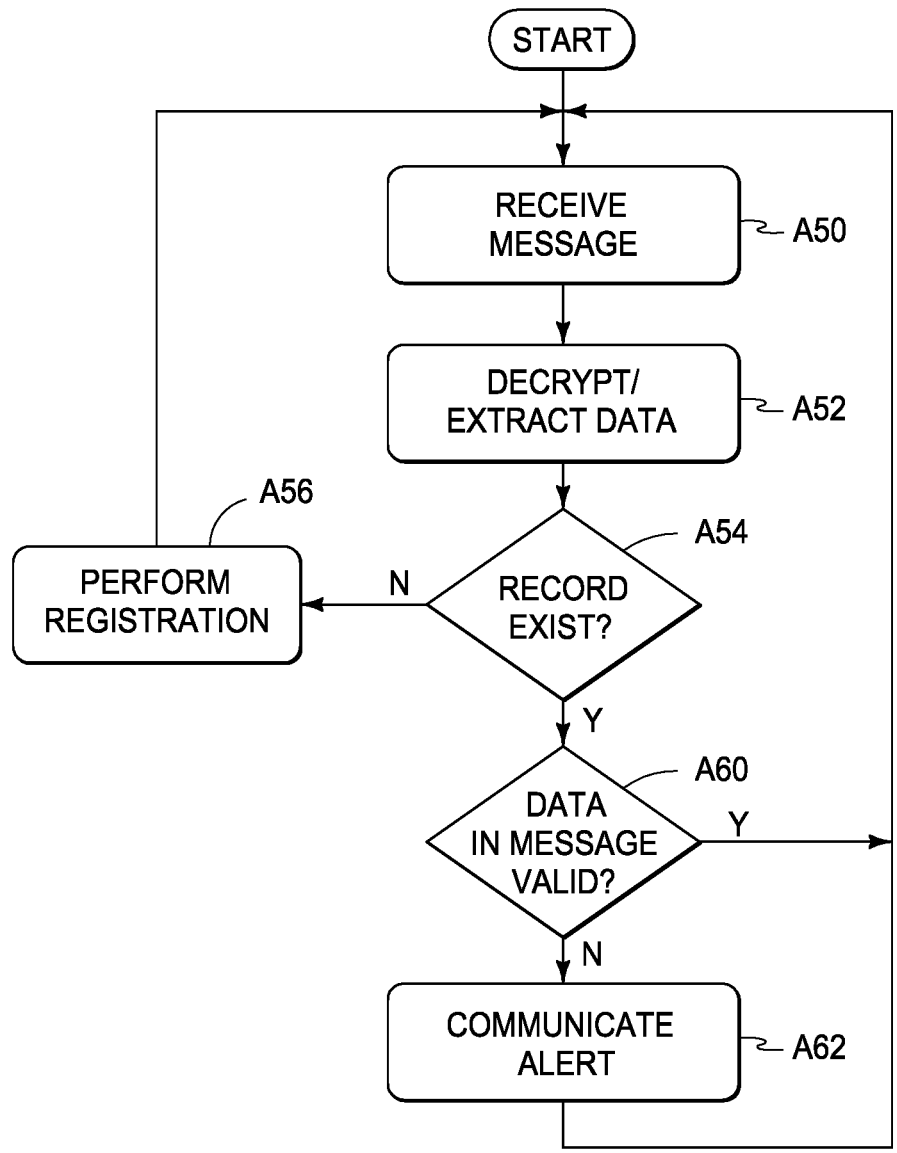
FIG. 6 is a flow chart of a method performed by a management device according to one embodiment.

Referring to FIG. 6, a flow chart of operations performed by a management device are described according to one embodiment. Other embodiments are possible including more, less and/or alternative acts. The described acts are controlled using processing circuitry of the management device in one embodiment.

At an act A50, the management device receives the message communicated by the intermediary device.

At an act A52, the management device decrypts and extracts the data of the received message.

At an act A54, the management device uses the VIN contained within the message to determine whether a record exists for the respective VIN.

If not, the process proceeds to an act A56 and a registration operation for the vehicle is performed including storing the data of the message including the value of the timing variable as the initial value of the timing variable which is used as an initial timing reference and synchronizes the management device in time with the monitoring device. Thereafter, the management device monitors for the receipt of additional messages.

If a record exists for the vehicle, the management device determines whether the data and the message are valid at an act A60. In one embodiment, the management device uses the timing data of the different timing protocols in order to validate the data and message. As described above, the management device may use the respective values of the timing variable and the date/time information of the message which contained the initial value of the timing variable and the currently processed message to calculate respective amounts of time which have passed since registration to determine whether the data and message are valid. The currently processed message includes first timing data in the form of the updated value of the timing variable which may be used with the initial value of the timing variable to calculate a period of time which has passed between the message which contained the initial value of the timing variable and the current message being processed according to the independent timing protocol. The message also includes second timing data in the form of the date/time timestamp (added to the message by the intermediary device or the management device) and the timestamp may be used with the timestamp of the initial message received from the monitoring device regarding the vehicle to calculate another period of time which has passed between the initial message and the current message. If the periods of time calculated using the first and second timing data are within a grace amount of time (e.g., within two hours), then the data is determined to be valid and is stored. Otherwise, the data is determined to be invalid.

If the result of act A60 is negative, the management device generates and communicates an alert to appropriate personnel at an act A62 and which indicates that the data of the vehicle is invalid and further investigation of the vehicle may be performed.

If the result of act A60 is affirmative or following act A62, the management device monitors for the receipt of additional messages regarding the vehicle from the monitoring device.

In some implementations, the monitoring device may be unplugged from a vehicle (for example to allow a service/scanning device to be coupled with the vehicle using the OBD port). Thereafter, the monitoring device may again be plugged into the same vehicle following the service. In this situation, the new value of the timing variable received by the management device after the monitoring device was again plugged into the vehicle would not match the expected value of the timing variable before the monitoring device was unplugged. In one embodiment, the management device would generate an alert due to the mismatch of the value of the timing variable. In addition, the management device may use the received mismatched value of the timing variable as a new initial or registration value of the timing variable for use with respect to validating subsequently received messages.

According to example embodiments discussed above, the monitoring devices 14 of the vehicle monitoring system 10 each include communications circuitry which can implement wired and/or wireless communications. For example, the monitoring devices 14 can communicate with respective circuitry including computer systems of the vehicles 12 to receive vehicle information regarding the vehicles, and which may include status information regarding one or more parameters of the vehicles, such as battery state (e.g., voltage), fuel level, error codes, last time the vehicle was started and other information described below.

The monitoring devices 14 can also include memory or other storage circuitry 26 to store digital information, such as executable code, and data received from the vehicles 12. The monitoring devices 14 can further include processing circuitry 24 configured to execute code, control communications with external devices including reception of messages from devices 14 and access or retrieval of vehicle information from the vehicles 12 and forwarding of the vehicle information to an intermediary device 16 and/or management device 18, control storage of the vehicle information using the storage circuitry of the devices 14, and implement communications with additional external devices via the communications circuitry 28.

Additional example operations of vehicle monitoring system 10 are described below. In one embodiment, management device 18 monitors statuses of one or more parameters of the vehicles 12 being monitored to identify issues with respect to the vehicles 12, such as low battery voltage. Following the identification of vehicles with issues, the management device 18 performs additional operations including notifying different parties with respect to addressing or resolving the issues regarding the vehicles 12 in a timely manner. As discussed according to one example embodiment below, the management device 18 may initially notify a party responsible for addressing or resolving the issues within the vehicles 12 and subsequentially notify another party responsible for assuring that the identified issues of the vehicles 12 are addressed or resolved in a timely manner.

In one embodiment, the monitoring devices 14 communicate the vehicle information in one or more messages regarding a vehicle 12 being monitored to management device 18 which uses the received vehicle information to implement additional operations as discussed below. In one example embodiment, messages of the external communications including the vehicle information from the monitoring devices 14 to the management device 18 are reported periodically. The monitoring devices 14 are configured to use any appropriate method of communications, including wired communications and/or wireless communications, such as Cellular, Wi-Fi and Bluetooth directly to management device 18 or via an intermediary device 16 described above.

Management device 18 includes appropriate communications circuitry to receive the messages which include vehicle information from the monitoring devices, storage circuitry to store the vehicle information in one or more databases, and processing circuitry configured to access and process the received vehicle information and implement example operations discussed below as a result of the processing. For example, the processing circuitry of the management device 18 processes status information within the messages regarding parameters of the vehicles to identify various issues with respect to the vehicles 12. One example issue may be one or more vehicles 12 have a low battery voltage as mentioned above which needs to be addressed or resolved, for example by charging and/or replacing the batteries of the vehicles 12. In this example, the battery level status information (e.g., voltages) of the vehicles 12 is processed to identify all vehicles 12 which have a battery level below a threshold. Thereafter, the processing circuitry may perform additional operations as a result of the processing of the status information including notifying one or more recipient parties via communications regarding issues with the vehicles 12 being monitored and which need to be addressed.

In one embodiment, users can access management device 18 to query and access the vehicle information including information about problems that exist with the vehicles 12 on the lots. In one embodiment, management device 18 processes the vehicle information and may generate and send automated messages to specified people, for example via text or email, to indicate the issues or problems which need to be addressed for specific vehicles 12. After a predefined passage of time, if those specified people have not addressed the issues of the vehicles 12 and updated the resolution of the issues of the vehicles 12 in the management device 18, then another notification message is sent to a second specified person such as a manager to indicate that the initial person has not completed his/her work in addressing the issues with one or more of the vehicles 12. In one embodiment, management device 18 receives messages, processes the vehicle information therein, and sends communications to appropriate recipient parties regarding issues of the vehicles 12 automatically in the absence of instruction from a user to the management device 18 to perform the functions.

In one embodiment, the monitoring devices 14 are coupled with respective vehicles 12 to be monitored. For example, the monitoring device 14 is coupled with the OBDII port of the vehicle 12 while the vehicle is left upon a lot an automobile dealer, or other premises where vehicles are being monitored.

The monitoring device 14 queries the computer system of the vehicle 12 for various information at a plurality of different moments of time such as periodically while the vehicle 12 is on the vehicle lot. The monitoring device 14 includes a unique ID for identification and which may be 6 bytes of hexadecimal. In one illustrative example, the following information is gathered by the monitoring device 12 from the vehicle 12:

VIN: 17 or 18 digit number which is compressed into a 13-byte number using encoding into a base-40 numbering system Mileage: double floating point number Battery Voltage: 1-byte number which must be divided by 10 to get the voltage. 255=25.5 volts 125=12.5 volts Fuel Level: 1-byte number indicating how much fuel is left in the tank 255=100%, 128=50%, 0=0%

Engine Error Codes: up to four engine error codes of 4-byte hexadecimals each

Timing information: When the vehicle was last turned on: 3-byte integer indicating the number of 4.6875 second increments since the device was first placed in the vehicle. This gives a maximum of 910 day span in this example.

In one embodiment, the monitoring device 14 accesses the vehicle information and operates as a beacon to broadcast the information periodically, such as every 750 milliseconds, via messages as shown in FIG. 1. In one operational method, the intermediary device 16 is moved throughout a vehicle lot, receives vehicle information from the vehicles 12, and forwards the received vehicle information in messages to the management device 18 for processing and generation of notifications to appropriate personnel regarding the status of parameters of the vehicles 12 and indicating any issues thereof, such as a low battery level. In other embodiments, the monitoring devices 14 communicate directly with the management device 18, for example, via the Internet, without use of intermediary device 16.

A Bluetooth Low Energy (BLE) 32-byte packet is used to implement wireless communications 15 from the monitoring devices 14 in one embodiment. This communications technology has relatively low energy usage and is used to reduce or minimize drain of the vehicle's battery which powers the monitoring device 14 in one embodiment. Other communications protocols may be used in other embodiments including ultra-low-power wireless protocols such as: ANT, Zigbee, RF4CE, IEEE 802.11ah. Additionally, instead of using a simple broadcast, other communications such as use of a mesh network may be utilized to communicate vehicle information from the monitoring devices 14.

In one more specific embodiment, the vehicle information gathered from the vehicle 14 is sent in a plurality of 32-byte packets including a first packet type which contains the VIN of the vehicle along with the unique identifier of the monitoring device 14 and a second packet type which contains the vehicle information regarding the vehicle, for example including status information of various parameters of the vehicles, such as battery voltage, fuel level, mileage, etc.

In one arrangement using 32-byte packets, the identification of the monitoring device 14 is increased to 16 bytes of hexadecimal and three packet types are used including:

A first packet with the VIN and up to a 16-byte monitoring device identifier

A second packet including Engine Error Codes with up to a 16-byte monitoring device identifier A third packet of additional vehicle information (e.g., battery voltage, fuel level, etc.) with up to a 16-byte monitoring device identifier If more than one packet type is used, then the packets may be alternated when communicated from the monitoring device 14. In one embodiment, the monitoring device 14 is configured to communicate the packets with a predefined time period of delay (e.g., 750 milliseconds) therebetween to conserve the battery of the vehicle 12 being monitored.

Using this received vehicle information, the management device 14 can also store information regarding the first time that the vehicle was placed on a dealer's lot and monitor the length of time the vehicle remains on the dealer's lot with respect to a threshold length of time.

In one embodiment, the monitoring devices 14 are configured as beacons to only transmit data and are incapable of processing communications received by the intermediary device 16 or management device 18. In other embodiments, monitoring devices 14 are configured to output communications, for example including vehicle information, as well as receive and process inbound communications to the monitoring devices 14.

In one embodiment, management device 18 resides on a cloud service and implements one or more relational databases (e.g., Structured Query Language—SQL) with respect to vehicle information which is received from the plurality of monitoring devices 14.

Management device 18 maintains a vehicle information database including a record of vehicle information regarding each vehicle 12 being monitored including different statuses of different parameters of the vehicles in one embodiment. The following example information regarding parameters of the vehicles 12 may be stored in a respective record of the vehicle information database for each vehicle 12:

VIN of vehicle: 17 or 18 digit alpha-numeric (uniquely identifies each vehicle)
Mileage: double floating point
Change in Mileage Since initiation of Monitoring: double floating point
Battery Voltage: floating point
Fuel Level: floating point
Engine Error Codes: Coded, correlates to Engine Error Codes Database
Last Runtime: date and time of when vehicle was last turned on (format date)
Unique Monitoring device Identifier
Company ID: alpha-numeric, correlate to the Company database (e.g., owner of the lot where the vehicles are stored)
First date/time vehicle was reported on: (e.g. "2018-06-14 11:33 am")
Last date/time vehicle was reported on: (e.g. "2018-06-14 11:33 am")
Last time vehicle was started In one embodiment, management device 18 also maintains an engine error codes database which includes the following information for each numerical error code which may be returned by the computer systems of vehicles 12 being monitored by the monitoring devices 14:

Code ID: 8 characters
Year: integer indicating the year of the vehicle with the error code
Make: Manufacturer of vehicle with the error code
Model: Model of vehicle with the error code
Title: Base description of problem corresponding to the error code (e.g., misfiring cylinder)
Details: More information on problem corresponding to the error code
Website: Webpage indicating problem and possible solution for the error code As mentioned above, management device 18 monitors statuses of one or more parameters of the vehicles 12 being monitored to identify a plurality of issues with respect to the vehicles 12, such as low battery voltage, and to implement appropriate operations towards having the issues addressed or resolved. Following the identification of vehicles 12 with issues, the management device 18 performs additional operations including initially notifying one party responsible for addressing the issues of identified vehicles 12 having the issues, and subsequentially notifying another party responsible for assuring that the issues of the vehicles 12 are addressed or resolved in a timely manner if issues of the vehicles 12 remain after predefined or specified amounts of time.

In one embodiment, the management device 18 is configured to execute a plurality of different events at a plurality of moments in time to identify respective individual issues of the vehicles 12 which need to be addressed or resolved.

In one more specific embodiment, the events include different sets of programming instructions, such as different scripts, which are individually executed by the processing circuitry during the execution of a respective event to identify a list of vehicles 12 having the respective issue in accordance with the specific event being executed. The status information regarding a respective parameter of the vehicles 12 is processed during the execution of the event to identify the list of the vehicles 12 having the issue of the respective event being executed. The programming instructions of the different events may be executed periodically as well as simultaneously or individually to identify the vehicles having the respective issues.

In one embodiment, management device 18 also maintains an event database including the events. The events each include programming instructions in the form of scripts in the described embodiment which the processing circuitry of the management device 18 executes to process the status information of the respective parameter (e.g., battery voltage) being monitored for the respective event and to identify the vehicles 12 having the respective issue being monitored during the execution of the event vehicles. In one embodiment, a separate event is created for each parameter of the vehicles 12 being monitored. Example information for a low battery voltage event within the event database includes:

Event ID: alpha-numeric, unique ID of this event
Event Title (e.g. "Report Battery less than x volts")
Company ID: alpha-numeric, correlate to the Company database
How often to check: time-span (e.g. 24 hours, 3 days, 22 minutes)
Next time to check this event: DateTime (e.g. "2018-07-15 15:33")
Script: Database script to check for issues of vehicles on a dealer's lot and present within the vehicle information database (e.g. identify all vehicles in the vehicle information database having a battery voltage less than x volts)
Value1: Variable to insert into script (e.g. x=11)
Value2: Variable to insert into script
Value3: Variable to insert into script
Value4: Variable to insert into script
Service Person to address or resolve issue (title, first & last name)
Service Person contact method (e.g. email, text, phone call)
Service Person contact details (e.g. someone@mail.com, 503-555-1212)
Message to send to Service Person (e.g. "Please start these vehicles. Their batteries are low.")
Time period in which problem must be addressed: defines moment in time in the future to address the issue determined by a specified time-span from present time (e.g. 24 hours, 3 days, 22 minutes)
Service Manager Name to talk with initial person about not resolving the issue in a specified time period (title, first & last name)

Service Manager contact method (e.g. email, text, phone call)

Service Manager contact details (e.g. someoneelse@mail.com, 503-555-1213)

Each of variables Value 1-Value 4 above may be specified by the dealer or set to default levels (e.g., 11 Volts may be set as the default low battery voltage threshold).

Due to the flexibility of using database scripts to implement the events according to one embodiment, there are many different parameters of the vehicles which can be automatically and periodically checked for by the management device including but not limited to:

Time Vehicle has been on lot: Dealerships pay more when a vehicle is in inventory too long Vehicle no longer being seen: indicates loss of diagnostic device or theft of vehicle Test drive occurred Excessive mileage change: indicates several issues such as need to physically check for damage or re-evaluate the value of the vehicle Last time vehicle has been run: If this is off hours when the dealer is closed, then unauthorized use of the vehicle may have occurred Battery level low Fuel (too high or low as compared to respective high and low fuel level thresholds)

Engine Error problems

Vehicle driven off premises (e.g., a geo-fence).

Vehicle recall by factory

Vehicle has not been moved for too long: Vehicles need to be slightly moved to stop flat-spots on tires and engines need to be run periodically.

Management device 18 additionally maintains an event queue database which is used to monitor the correction of issues of the vehicles 12 being monitoring in one embodiment. In one embodiment, the event queue database stores a plurality of lists of vehicles having respective different issues which need to be addressed as a result of the processing of the status information. In the presently described embodiment, the event queue database stores the following information for each event:

Event ID: correlates to the event database (e.g., low battery voltage event)

VIN List: list of VINs of vehicles which had this issue or problem

Expire Time: time by which the issue of the event should be addressed or the manager will be informed (e.g. "2018-07-31 20:00")

The management device 18 is sent the data packets from the monitoring device 14 or intermediary device 16 (if utilized). The received vehicle information within the data packets is stored in the vehicle information database of the management device 18 in one embodiment. Extra information regarding the vehicles 12 being monitored may be extrapolated from the vehicle information by the processing circuitry of the management device 18 as needed. Example extrapolated information includes "Change in Mileage From First date/time vehicle was reported" and "Time vehicle is on dealer lot."

Additional information gathered from the monitoring device 14 or intermediary device 16 may also be stored within the vehicle information database, such as location information which is indicative of the location of the vehicle 12 being monitored as detected by location circuitry (e.g., GPS) of the monitoring device 14 or intermediary device 16.

As mentioned previously, status information regarding one or more parameters of the vehicles is processed to identify issues with respect to the vehicles. Thereafter, the processing circuitry of the management device 18 may perform one or more operations in attempts to address or resolve the identified issues of the vehicles 12.

One example operation is generating and outputting a communication to a recipient party who is responsible for addressing or resolving the issues of the vehicles 12, such as specified mechanics or vehicle servicemen for attending to the issues. In one more specific example mentioned above, battery voltage status information of the vehicles may be processed by comparing the battery voltages of the vehicles 12 with a threshold and all vehicles 12 having a battery voltage less than the threshold may be identified and reported to service personnel or other appropriate recipient. In another example, the length of time in which the vehicle has been on a dealer's lot may be compared with a threshold length of time and all vehicles 12 exceeding the threshold may be identified and reported to a sales manager or other appropriate recipient. An additional example operation is generating and outputting a communication to another recipient party who is responsible for assuring that the issues of the vehicles 12 have been addressed or resolved in a timely manner, such as a service manager of an automobile dealership. Additional example operations and details thereof which may be performed by management device 12 are described below.

Figure 7:
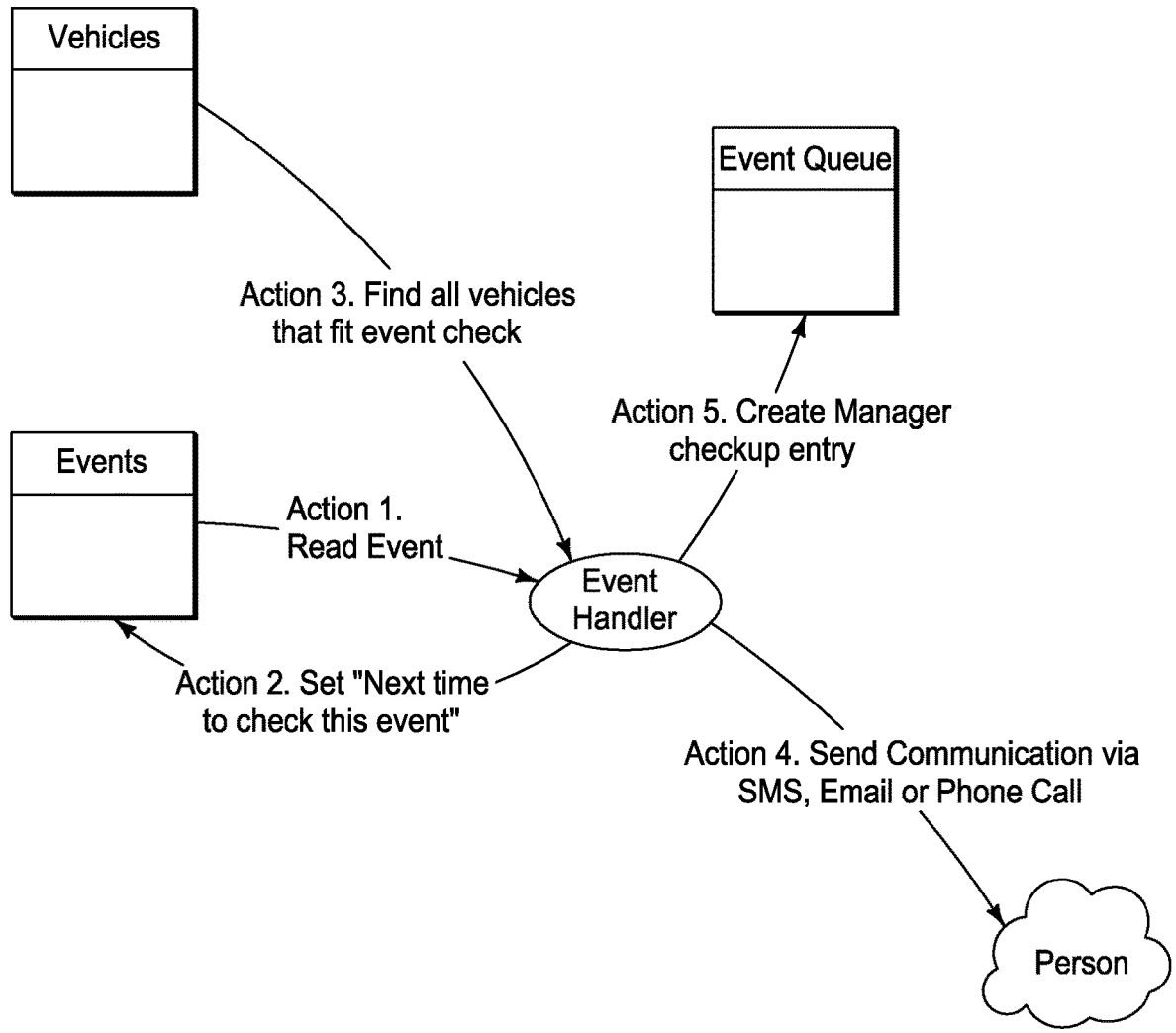
FIG. 7 illustrates operations performed by processing circuitry with respect to execution of events according to one embodiment.

Referring to FIG. 7, one example method performed by processing circuitry of the management device 18 operating as an event handler with respect to execution of events with respect to vehicles 12 monitored by the monitoring devices 14, and implementing operations in response to the execution of the events is shown. Other methods are possible including more, less and/or alternative actions.

In one embodiment, periodically (e.g., every minute) the management device 14 checks its event database (Action 1) to identify individual events (e.g., low battery voltage, fuel level, etc.) which need to be executed during the present execution of the method of FIG. 7.

For events which have no value for "Next time to check this event", those events are immediately checked. For events in which the "Next time to check this event" is older than the current time, those events are immediately checked. In one embodiment, the sets of programming instructions for the respective events needing to be checked are loaded and executed by the processing circuitry.

Other events than those requiring immediate execution and checking are executed against the vehicles being monitored during a subsequent execution of FIG. 7.

The operation of FIG. 7 is described below with respect to execution of a low battery voltage event for monitoring of the battery voltage level parameter of the vehicles. In one embodiment, executing the low battery voltage event includes updating the "Next time to check this event" field at Action 2 to be the current time plus the time defined in "How often to check" of the event being executed to define when the low battery voltage event is to be next executed.

At an Action 3, the processing circuitry runs the database script for the low battery voltage event against each vehicle being monitored in the vehicle information database to identify those vehicles with a low battery voltage.

In some embodiments, the management device 18 monitors vehicles of a plurality of different entities, such as different automobile dealers, different automobile rental companies, etc. and the events can be executed against the vehicles in the vehicle information database which are associated with a single entity during the execution of the low battery voltage event and the low battery voltage event may be executed against vehicles in the vehicle information database which are associated with other entities during subsequent executions of the low battery voltage event. In one embodiment, processing circuitry first identifies the list of vehicles in the records of the vehicle information database which belong to a given entity using the "Company ID" field of the vehicle records stored in the vehicle information database, and then the low battery voltage event is executed against the identified list of vehicles which belong to the entity to identify those with a low battery voltage.

For every vehicle returned as true by the script being executed (e.g., those vehicles meeting the specified criteria for the low battery voltage event having a battery voltage less than variable x), those identified vehicles are placed in a list of vehicles having the issue (e.g., a low battery voltage). If the list has no vehicles in it, then the execution of the script is terminated.

Otherwise, at an Action 4, an appropriate communication (e.g., SMS, email, phone call, etc.) is generated and sent to the appropriate person indicated in the event using the Person Name who is responsible for addressing or resolving the issues regarding the vehicles (title, first & last name), Person contact method (e.g. email, text, phone call) and Person contact details set forth in the event. The communication includes an initial list of vehicles having the issue being monitored during the event execution of the event (e.g., low battery voltage). The communication may also include various additional information of the vehicles with an issue. In one implementation, the management device is configured to generate the communication to include information regarding an error code if the execution of an event detects the presence of an error code from one or more of the vehicles.

Thereafter, the management device generates and stores an action item to be performed at a moment in time in the future to determine whether the corresponding issue of the vehicles has been addressed at an Action 5. In one more specific example, a manager checkup entry or record is created in the event queue database. This entry includes the list of VINs of the vehicles identified in Action 3 as having low battery voltage and the moment in time in the future when the action item is to be performed. For example, the moment in time in the future is an "Expire Time" which is set to the current time plus "Time period in which problem must be addressed" of the event.

Figure 8:
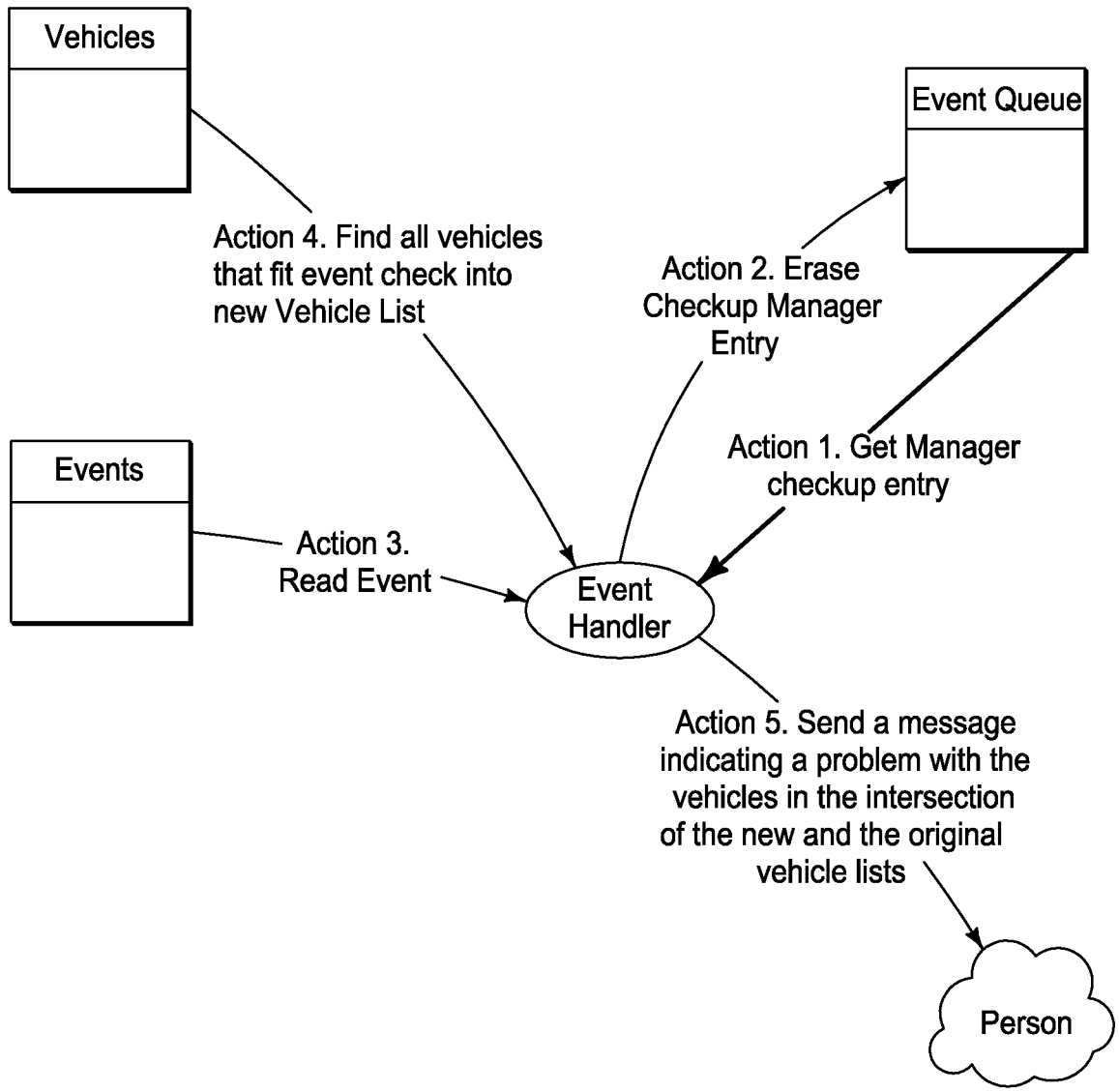
FIG. 8 illustrates operations performed by processor circuitry with respect to vehicle issues which have not been addressed.

Referring to FIG. 8, additional details implemented by the management device 18 with respect to monitoring of the manager checkup entry or records within the event queue database are shown according to one embodiment.

Periodically (e.g., every minute), the processing circuitry of the management device 18 checks the manager checkup entry or records of the event queue database at an Action 1. In one implementation, checking the event queue database includes for each record, determining if the record has a "Expire Time" later than now, and if so do nothing for the presently analyzed record and proceed to the next record. This process is repeated for each manager checkup entry or record until a record is identified with an "Expire Time" which has passed in time.

Once a manager checkup entry or record has been identified with an "Expire Time" which has passed, the management device performs the action item discussed further below.

At an Action 2, the manager checkup entry or record is deleted from the event queue database.

At an Action 3, the processing circuitry reads details resulting from the previous execution of the event from the event database using the event ID from the event queue database and which identifies the initial list of vehicles which had the issue being monitored by the respective event (e.g., initial list of vehicles with low battery voltage and which was communicated to the responsible service personnel).

At an Action 4, the script for the respective event (e.g., programming instructions for identifying vehicles with low battery voltage) identified by the Event ID is again executed against the initial list of vehicles which includes the vehicles which had a low battery voltage when the manager checkup entry or record was created during the execution of FIG. 7. Any vehicles which still report as true (e.g., those vehicles having a low battery voltage after the Expire Time) go into a new or updated vehicle list for the respective manager checkup entry or record being processed. The processing circuitry processes the initial list and new list of vehicles to identify the vehicles which are present in both lists (i.e., the intersection of the initial vehicle list of vehicles having low battery voltage when the entry or record was created during the execution of FIG. 7 and the new vehicle list of vehicles having low battery voltage during the execution of FIG. 8). This processing is performed by the processing circuitry to remove vehicles from the list which have had the respective issues addressed or resolved.

If that intersection of vehicles is empty, then the issues of all vehicles within the manager checkup entry or record have been addressed or serviced and the respective manager checkup entry or record being processed may be deleted from the event queue database.

If the intersection of vehicles is not empty, the processing circuitry 18 generates and outputs a communication to a recipient party who is responsible for assuring that the issues of the vehicles 12 have been addressed and as a result of the issue not having been addressed for at least one vehicle within the specified amount of time. In one more specific embodiment, the management device generates and sends the communication to the service manager at an Action 5 indicating the original message sent to the initially notified person(s), the time frame that was expected for the servicing of the vehicle to be completed, and identifiers of the vehicles (e.g., VINs) which are on the intersection list. This information informs the manager of vehicles 12 still requiring service to address one or more issue detected by the monitoring devices 14.

Additional information that could be added to the messages sent to the initial service person and manager may include the locations of the vehicles having issues as well as the year, make, model, and color and any other useful information of the vehicles.

In one embodiment, the processing circuitry of the management device is configured to automatically generate and output the initial communication to the recipient party responsible for addressing or resolving issues of the vehicles in the absence of input from a human, to automatically generate, store and review action items in the absence of input from a human, and to automatically generate and output another communication to a recipient party responsible for assuring that the issues of the vehicles are timely addressed or resolved when issues of one or more vehicles have not been resolved in the absence of input from a human.

Using the vehicle monitoring system and methods described herein including the monitoring devices and management device, the vehicles with low battery voltages or other issues are automatically reported to service personnel and managers according to one embodiment. The monitoring and reporting of vehicles with issues to service personnel and managers are automatic without intervention of a user in one implementation as discussed above. Following reporting of vehicles with a low battery in one example, service personnel can then charge the batteries of the vehicles, start the vehicles without needing to jumpstart or perform other maintenance. In addition, the reason for the battery drain can also be addressed. For instance, the lights were left on or the key was left in the ignition of the vehicles.

In addition, using the vehicle monitoring system and methods described herein, the service manager will receive messages indicating which of the vehicles on the lot need servicing and permit follow-up monitoring to verify that the servicing has addressed the issues with the vehicles in a timely manner. This results in a revenue stream for the dealer's service department, and accordingly, sending messages on the health of the vehicles reduces cost, time, and generates revenue according to some aspects of the disclosure.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A vehicle monitoring system comprising:
   a plurality of vehicle monitoring devices individually configured to communicate with circuitry of a respective one of a plurality of vehicles being monitored by the vehicle monitoring system, to receive vehicle information regarding the one vehicle from the circuitry of the one vehicle at a plurality of first moments in time, and to output a plurality of messages externally of the vehicle monitoring device at a plurality of second moments in time;
   wherein the messages from the vehicle monitoring devices include the vehicle information being monitored by the vehicle monitoring system;
   a management device configured to receive the messages and the vehicle information included within the messages, to store the vehicle information, to process the vehicle information, and to generate and output a communication regarding the vehicles to a recipient party; and
   wherein the vehicle information includes information regarding the length of time the vehicle has been on a dealer's lot.

2. The system of claim 1 wherein the communication includes the vehicle information.

3. The system of claim 1 wherein the vehicle information indicates an issue with respect to the vehicles, and wherein the management device is further configured to generate the communication to include information regarding the issue and to output the communication to the recipient party who is responsible for addressing the issue of the vehicles.

4. The system of claim 1 wherein the vehicle information indicates an issue with respect to the vehicles, and wherein the management device is further configured to generate the communication to include information regarding the issue and to output the communication to the recipient party who is responsible for assuring that the issue has been addressed.

5. The system of claim 1 wherein the management device is configured to process the vehicle information to identify an issue with respect to the vehicles which needs to be addressed and to generate the communication to include information regarding the issue.

6. The system of claim 5 wherein the management device is configured to output the communication to the recipient party who is responsible for addressing the issue of the vehicles.

7. The system of claim 6 wherein the management device is further configured to generate and store an action item to be performed at a third moment in time in the future to determine whether the issue of the vehicles has been addressed.

8. The system of claim 7 wherein the management device is configured to process the vehicle information at the third moment in time in the future in accordance with the action item to determine whether the issue of the vehicles has been addressed.

9. The system of claim 8 wherein the communication is an initial communication and the management device is configured to generate and output another communication to another recipient party as a result of the issue of at least one of the vehicles not being addressed at the third moment in time in the future, and wherein the another recipient party is responsible for assuring that the issue of the vehicles has been addressed.

10. The system of claim 9 wherein processing circuitry of the management device is configured to:
    automatically generate and output the initial communication in the absence of input from a human;
    automatically generate, store and review the action item in the absence of input from a human; and
    automatically generate and output the another communication in the absence of input from a human.

11. The system of claim 1 wherein the management device is configured to execute a plurality of different events at a plurality of third moments in time, and wherein the management device processes the vehicle information during the execution of an individual one of the events to identify the vehicles having a respective one of a plurality of different issues.

12. The system of claim 11 wherein the execution of one of the events by the processing circuitry selects the recipient party from a plurality of other parties.

13. The system of claim 11 wherein the management device is configured to execute different sets of programming instructions during the execution of the different events.

14. The system of claim 11 wherein the executions of the events specify respective fourth moments in time in the future for the respective different issues of the vehicles to be addressed.

15. The system of claim 11 wherein the management device is configured to generate a first list of vehicles having one of the issues during execution of one of the events, to generate a second list of vehicles having the one of the issues at a fourth moment in time, to process the first and second lists of vehicles, and to generate and output the communication to the recipient party who is responsible for assuring that the issue has been addressed as a result of the processing.

16. The system of claim 1 wherein the management device is configured to use the vehicle information to generate a list of the vehicles being monitored which have an issue which needs to be addressed.

17. The system of claim 1 wherein the management device is configured to generate a vehicle information database comprising status information regarding a plurality of parameters of the vehicles being monitored, an event database comprising different sets of programming instructions to process the status information of the vehicles being monitored, and an event queue database comprising a plurality of lists of vehicles having respective different issues which need to be addressed as a result of the processing of the status information.

18. The system of claim 1 wherein the vehicle information includes error codes which were generated by the vehicles, and the management device is configured to generate the communication to include information regarding one of the error codes.

19. The system of claim 1 wherein the vehicle information includes information regarding the last time the vehicle was started.

20. The system of claim 1 wherein the vehicle information includes information regarding a voltage of a battery of a vehicle, and wherein the management device is configured to compare the voltage of the battery of the vehicle with a threshold voltage, and to generate the communication to indicate that the voltage of the battery of the vehicle is low as a result of the comparison.

21. A vehicle monitoring system comprising:
a plurality of vehicle monitoring devices individually configured to communicate with circuitry of a respective one of a plurality of vehicles being monitored by the vehicle monitoring system, to receive vehicle information regarding the one vehicle from the circuitry of the one vehicle at a plurality of first moments in time, and to output a plurality of messages externally of the vehicle monitoring device at a plurality of second moments in time;
wherein the messages from the vehicle monitoring devices include the vehicle information being monitored by the vehicle monitoring system;
a management device configured to receive the messages and the vehicle information included within the messages, to store the vehicle information, to process the vehicle information, and to generate and output a communication regarding the vehicles to a recipient party;
wherein the management device is configured to process the vehicle information to identify an issue with respect to the vehicles which needs to be addressed and to generate the communication to include information regarding the issue;
wherein the management device is configured to output the communication to the recipient party who is responsible for addressing the issue of the vehicles;
wherein the management device is further configured to generate and store an action item to be performed at a third moment in time in the future to determine whether the issue of the vehicles has been addressed;
wherein the management device is configured to process the vehicle information at the third moment in time in the future in accordance with the action item to determine whether the issue of the vehicles has been addressed;
wherein the communication is an initial communication and the management device is configured to generate and output another communication to another recipient party as a result of the issue of at least one of the vehicles not being addressed at the third moment in time in the future, and wherein the another recipient party is responsible for assuring that the issue of the vehicles has been addressed; and
wherein processing circuitry of the management device is configured to:
automatically generate and output the initial communication in the absence of input from a human;
automatically generate, store and review the action item in the absence of input from a human; and
automatically generate and output the another communication in the absence of input from a human.

22. A vehicle monitoring system comprising:
a plurality of vehicle monitoring devices individually configured to communicate with circuitry of a respective one of a plurality of vehicles being monitored by the vehicle monitoring system, to receive vehicle information regarding the one vehicle from the circuitry of the one vehicle at a plurality of first moments in time, and to output a plurality of messages externally of the vehicle monitoring device at a plurality of second moments in time;
wherein the messages from the vehicle monitoring devices include the vehicle information being monitored by the vehicle monitoring system;
a management device configured to receive the messages and the vehicle information included within the messages, to store the vehicle information, to process the vehicle information, and to generate and output a communication regarding the vehicles to a recipient party;
wherein the management device is configured to execute a plurality of different events at a plurality of third moments in time, and wherein the management device processes the vehicle information during the execution of an individual one of the events to identify the vehicles having a respective one of a plurality of different issues; and
wherein the execution of one of the events by the processing circuitry selects the recipient party from a plurality of other parties.

23. A vehicle monitoring system comprising:
a plurality of vehicle monitoring devices individually configured to communicate with circuitry of a respective one of a plurality of vehicles being monitored by the vehicle monitoring system, to receive vehicle information regarding the one vehicle from the circuitry of the one vehicle at a plurality of first moments in time, and to output a plurality of messages externally of the vehicle monitoring device at a plurality of second moments in time;
wherein the messages from the vehicle monitoring devices include the vehicle information being monitored by the vehicle monitoring system; and
a management device configured to receive the messages and the vehicle information included within the messages, to store the vehicle information, to process the vehicle information, and to generate and output a communication regarding the vehicles to a recipient party;

wherein the management device is configured to execute a plurality of different events at a plurality of third moments in time, and wherein the management device processes the vehicle information during the execution of an individual one of the events to identify the vehicles having a respective one of a plurality of different issues; and wherein the management device is configured to execute different sets of programming instructions during the execution of the different events.

24. A vehicle monitoring system comprising:

a plurality of vehicle monitoring devices individually configured to communicate with circuitry of a respective one of a plurality of vehicles being monitored by the vehicle monitoring system, to receive vehicle information regarding the one vehicle from the circuitry of the one vehicle at a plurality of first moments in time, and to output a plurality of messages externally of the vehicle monitoring device at a plurality of second moments in time;

wherein the messages from the vehicle monitoring devices include the vehicle information being monitored by the vehicle monitoring system;

a management device configured to receive the messages and the vehicle information included within the messages, to store the vehicle information, to process the vehicle information, and to generate and output a communication regarding the vehicles to a recipient party;

wherein the management device is configured to execute a plurality of different events at a plurality of third moments in time, and wherein the management device processes the vehicle information during the execution of an individual one of the events to identify the vehicles having a respective one of a plurality of different issues; and wherein the management device is configured to generate a first list of vehicles having one of the issues during execution of one of the events, to generate a second list of vehicles having the one of the issues at a fourth moment in time, to process the first and second lists of vehicles, and to generate and output the communication to the recipient party who is responsible for assuring that the issue has been addressed as a result of the processing.

* * * * *

UNITED STATES PATENT AND TRADEMARK OFFICE
CERTIFICATE OF CORRECTION

| | | |
|---|---|---|
| PATENT NO. | : 11,430,336 B2 | Page 1 of 1 |
| APPLICATION NO. | : 16/513550 | |
| DATED | : August 30, 2022 | |
| INVENTOR(S) | : Kenneth Lynn Smith and Michael David Smith | |

It is certified that error appears in the above-identified patent and that said Letters Patent is hereby corrected as shown below:

On the Title Page

(56) References Cited, page 2, 1st Column, 26th Line – Replace "2008/0128358 A1 5/2008 Turner et al." with --2008/0126358 A1 5/2008 Turner et al.--

(56) References Cited, page 2, 1st Column, 34th Line – Replace "2010/0226585 A1 9/2010 Bradley" with --2010/0228585 A1 9/2010 Bradley--

Signed and Sealed this
First Day of November, 2022

Katherine Kelly Vidal
*Director of the United States Patent and Trademark Office*